May 13, 1952     R. BROUSSARD     2,596,124
PARKING METER
Original Filed March 27, 1945     5 Sheets-Sheet 1
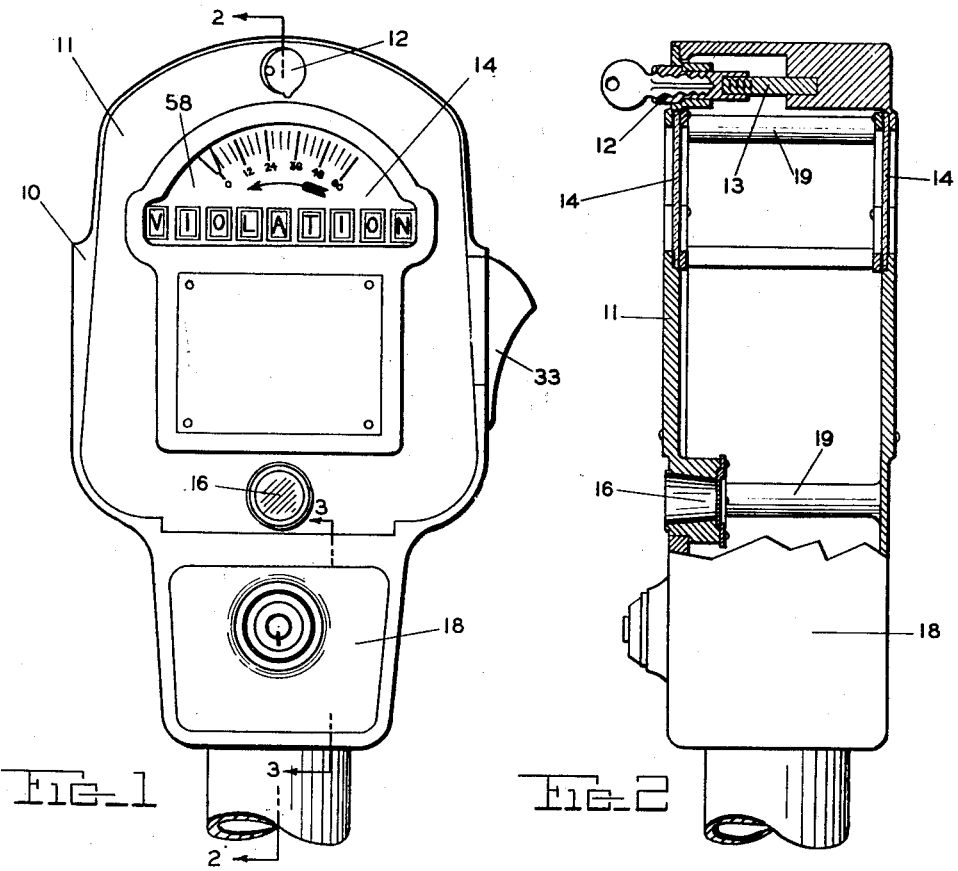
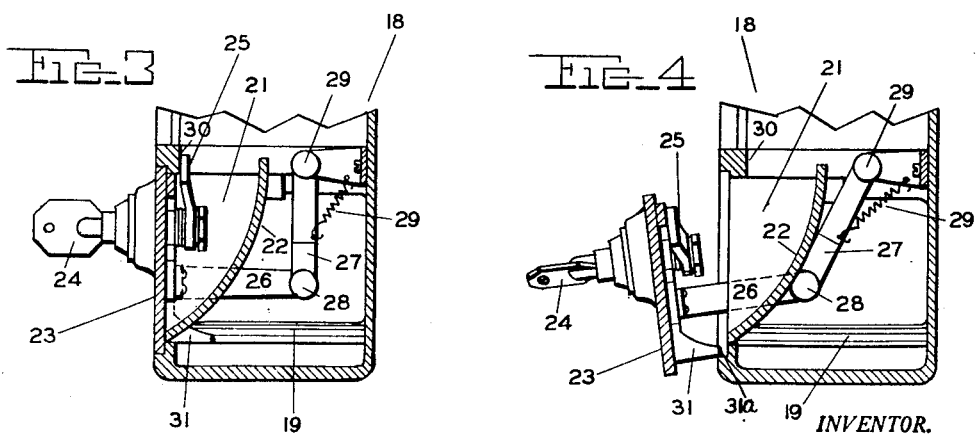
INVENTOR.
ROBERT BROUSSARD
BY
HIS ATTORNEY

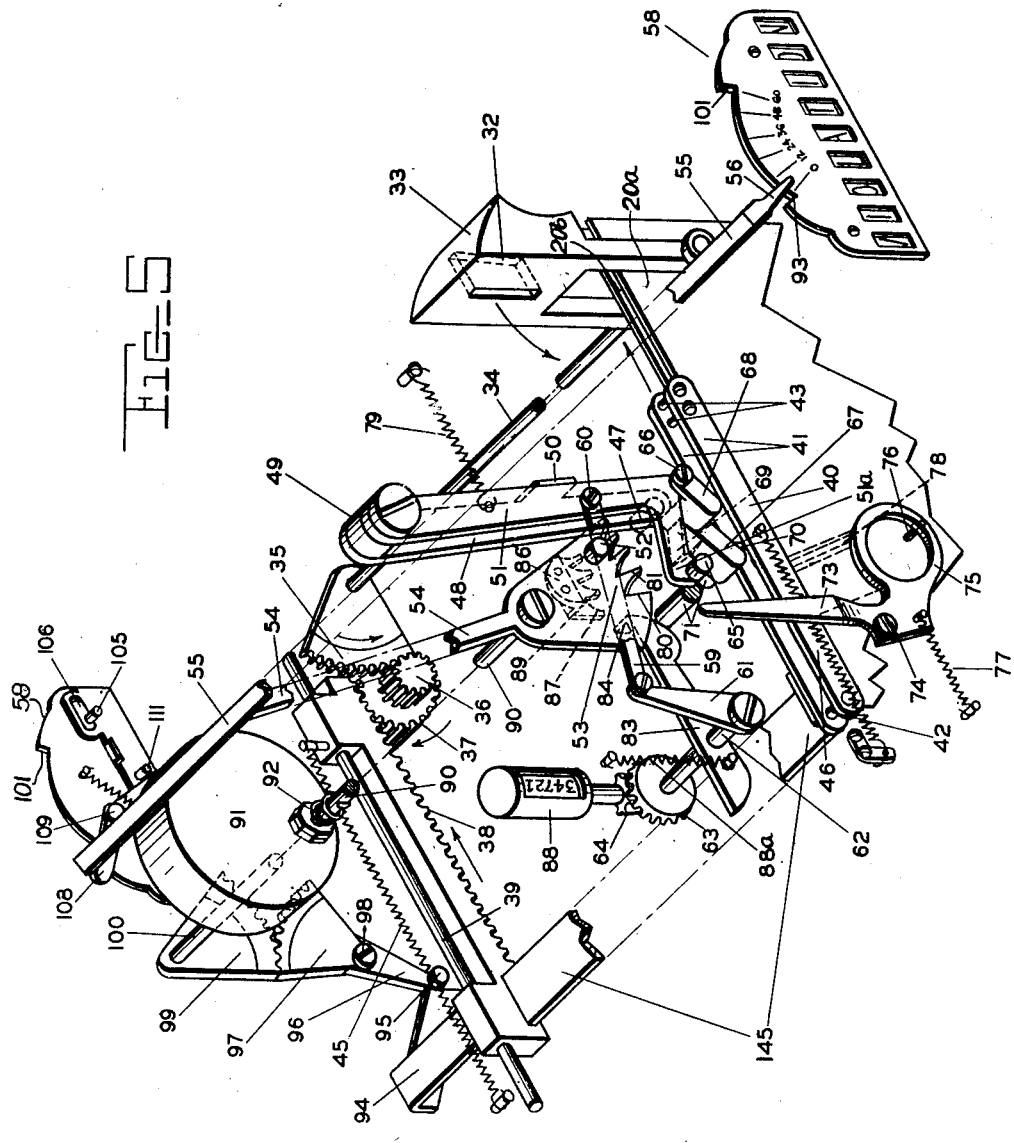

May 13, 1952     R. BROUSSARD     2,596,124
PARKING METER

Original Filed March 27, 1945     5 Sheets-Sheet 3

*INVENTOR.*
ROBERT BROUSSARD
BY
HIS ATTORNEY

May 13, 1952     R. BROUSSARD     2,596,124
PARKING METER
Original Filed March 27, 1945     5 Sheets-Sheet 4
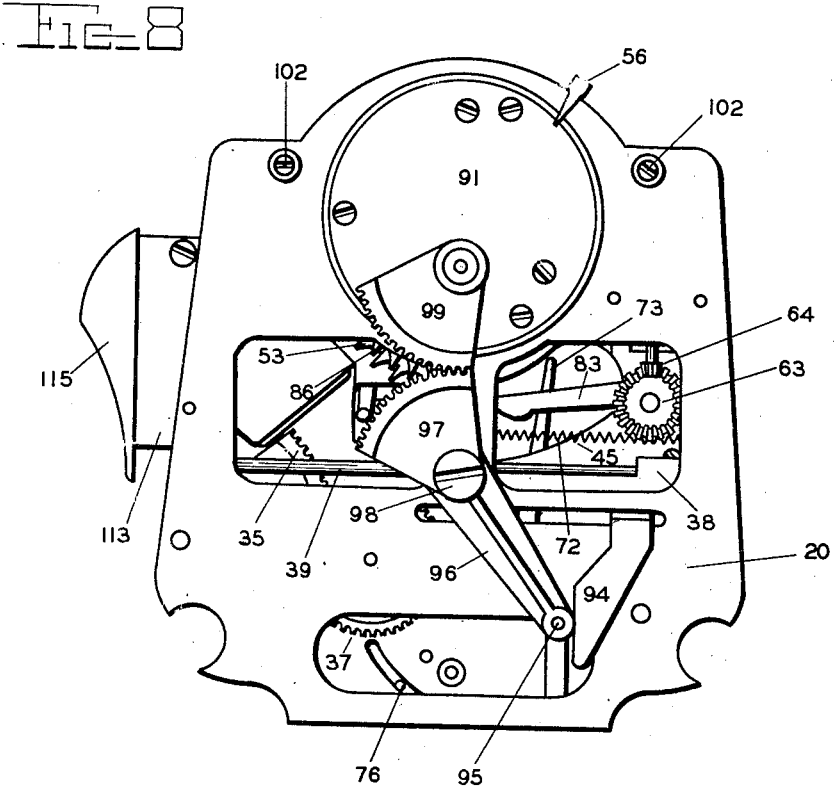
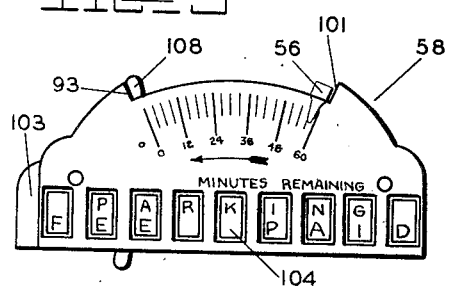
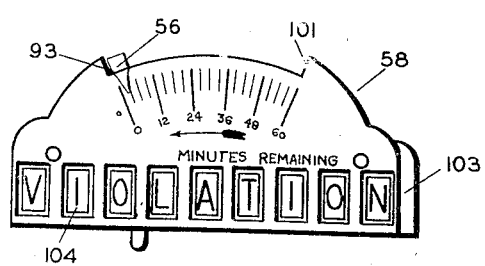
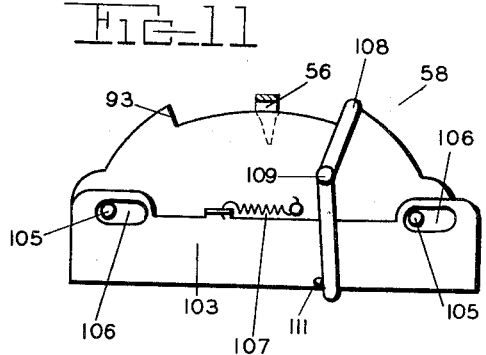
INVENTOR.
ROBERT BROUSSARD
BY
HIS ATTORNEY May 13, 1952     R. BROUSSARD     2,596,124
PARKING METER
Original Filed March 27, 1945     5 Sheets-Sheet 5
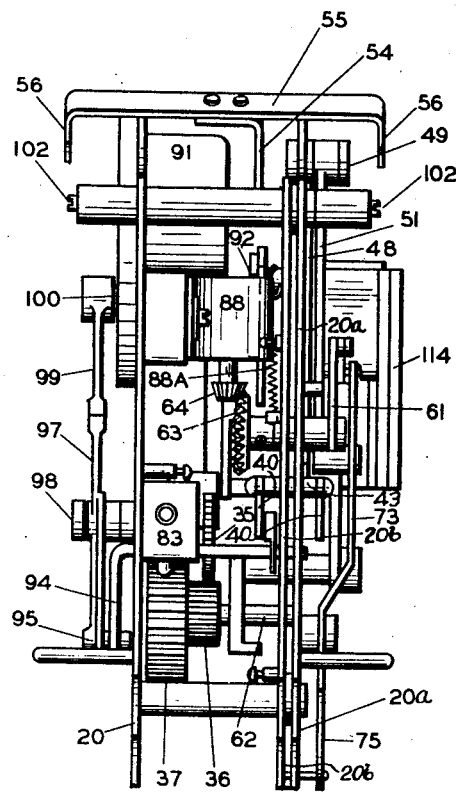
INVENTOR.
ROBERT BROUSSARD
BY
HIS ATTORNEY Patented May 13, 1952

2,596,124

UNITED STATES PATENT OFFICE 2,596,124

PARKING METER

Robert Broussard, Washington, D. C., assignor, by mesne assignments, to Duncan Parking Meter Corporation, Chicago, Ill., a corporation of Illinois Original application March 27, 1945, Serial No. 585,152. Divided and this application July 18, 1946, Serial No. 684,581

1 Claim. (Cl. 161—15)

My application is a division of my copending application Serial No. 585,152, filed March 27, 1945, and entitled Parking Meter and Coin Slot Therefor divided into this application, and copending applications Serial Nos. 684,579; 684,580; and 684,582; and the invention relates to parking meters, for use along streets, roadways and in conjunction with vehicle stalls and parking areas for example.

An object of my invention is the provision of a simple, practical and inexpensive parking meter of rugged construction having cam feed means, forming an integral and essential part of the same, which is adapted for setting timing mechanism of the apparatus to initiated position while feeding a coin.

Another object is to provide a device of the character indicated wherein driving energy for included set-initiated timing means is stored as an incident to the time-setting operation and in which energy imparted to coin feeding means of the meter is stored for driving the meter timing means.

Another object of my invention is the provision, in a device of the character indicated, of timing apparatus for selective setting to measure any one of several differing periods of time corresponding to different coin values payable to the meter.

Other objects in part will be obvious and in part referred to hereinafter.

The invention accordingly consists in the combination of elements, features of construction and arrangement of parts as described herein and particularly set forth in the claims at the end of this specification.

In the accompanying drawings, in which like reference characters denote like parts throughout the several views, there is illustrated a parking meter embodying certain features of my invention.

Figure 1 is a front elevation view of a preferred form of my parking meter;

Figure 2 is a partial sectional view in elevation along the line 2—2 of the meter housing with the meter operating mechanism removed;

Figure 3 is a fragmentary sectional side elevation view of the meter coin deposit box along a line 3—3 of Figure 1, showing the coin box door closed;

Figure 4 is a view similar to Figure 3 showing the coin box door open;

Figure 5 is a schematic isometric exploded view of meter operating mechanism in which the interaction of certain movable parts are illustrated;

Figure 8 is a rear elevation view of the mechanism illustrated in Figures 6 and 7;

Figure 9 is a detail view of the front of the meter time indicator and signal plate in position representative of an unexpired parking period;

Figure 10 is a view similar to Figure 9 but showing the plate in expired parking time position;

Figure 11 is a detailed rear view of the time indicator plate;

Figure 12 is a side elevation view corresponding to Figures 6, 7 and 8.

Figure 6:
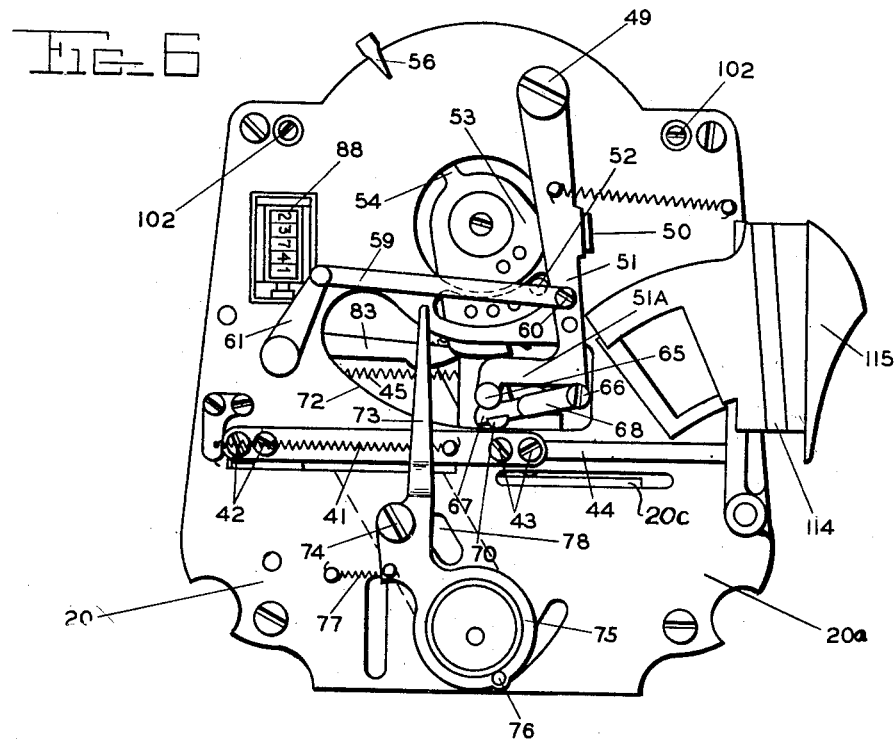
Figure 6 is a front elevation view of the meter mechanism.
Figure 7:
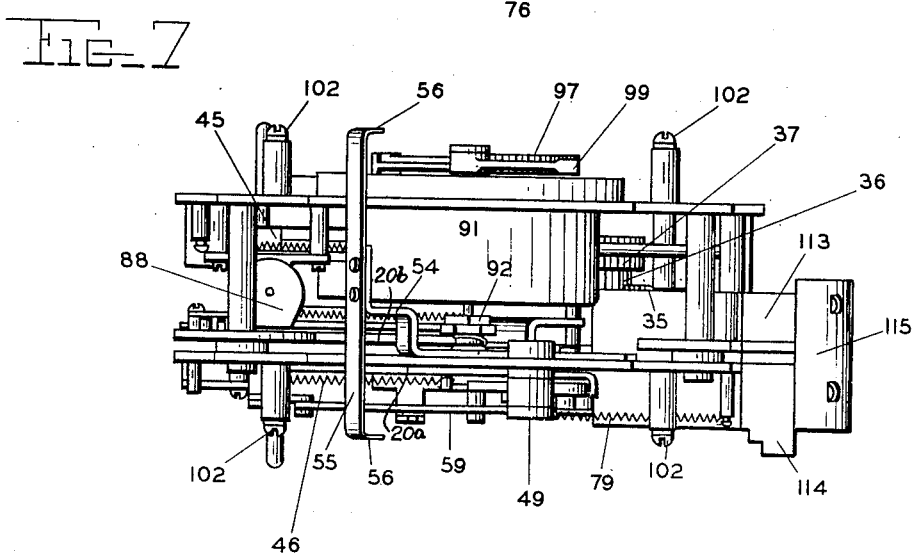
Figure 7 is a plan view corresponding to Figure 6.

Referring now, more particularly, to the practice of my invention, attention is directed to the drawings, notably Figures 1 and 2. The meter will be seen to comprise an external housing 10 (Fig. 1) into which is seated a housing door 11. The door is held in place by a screw type lock 12 which engages with post 13 fixed into the housing as best illustrated in Figure 2. The upper part of the door is cut away to provide a glass window 14 for revealing a time indicator and signal plate which is to be discussed in detail later. A similar window for revealing a like time indicator and signal plate is provided in the back of the housing. In the housing door 11 there is a coin window 16 which displays, from inside, the last coin which has served to set the meter. A coin receiver 33 for manipulation in setting the meter extends through the right hand side of the housing (Fig. 1). The lower portion of the housing comprises a coin deposit chamber 18 for receiving coins after display of the same at window 16. The housing is sturdily reinforced with reinforcing ribs 19 and on inside walls is shaped to conform with the curvular edges of face plates 20, 20a and 20b (shown in Figs. 6, 8 and 12) so that the meter mechanism is firmly held in place in the housing without necessity for bolting and yet is easily removed.

In Figure 5, substantially all frame work, face plates, housing, and the like, of the meter have been omitted to facilitate a clearer understanding of certain features of my invention. The mechanism illustrated is adapted for receiving a coin, for example a nickel or a penny, which is inserted in outside end of slot 32 of coin receiver 33. The receiver then is pushed in (counterclockwise) for delivering and depositing the coin to a cooperating carrier or slide for feeding the coin in a manner more particularly discussed hereinafter. This motion of the receiver is transmitted along shaft 34 to sector gear 35 which in turn causes gear 36 and pinion 37 to rotate clockwise driving rack 38 to the right as indicated by arrow in Figure 5. The rack 38 is guided during movement by guide rod 39 whose position is fixed.

The coin carrier or slide 40, composed of two parallel plates 41 connected by lugs 42 and 43 moving in slot 44 (Fig. 6) provided in parallel face plates 20a and 20b (Figs. 5 and 12), is rigidly attached to rack 38 by connecting plate 145. The plates 20a and 20b form the walls of a compartment for the actuating coin as appears more fully hereinafter. A bottom plate 20a between the plates 20a and 20b adjacent slot 44 (see Fig. 6) forms a floor or track for supporting the coin during the carrying action. As the rack is driven to the right, so is the slide such that when coin receiver 33 has moved down through the entire path of its arc, the coin slide has moved in synchronism to its extreme right hand position. At this point the coin is discharged from the receiver (this will be described in detail later) and drops between plates 20a and 20b and onto bottom of track 20c to seat just in front of lugs 43.

Now that the coin is deposited, pressure is released on the coin receiver 33. Since the previously described action was accomplished under spring tension exerted by springs 45 and 46, when pressure on the coin receiver is released, the opposite motion automatically takes place; that is, provided the receiver 33 is relinquished, shaft 34 and sector gear 35 move clockwise, gear 36 and pinion 37 move counterclockwise thus driving rack 38 and slide 40 to which it is connected, to the left. As the coin slide moves to the left, lugs 43 carry the coin forward with it.

A nickel and a penny cause finger plate 53 to be rotated preferably as a part of the timing mechanism: the nickel by engaging post 47 rotates rear lever arm 48 which by coming in contact with post 52 rotates finger plate 53 through its entire arc, setting indicator pointer 56 at sixty minutes; while the penny by virtue of its smaller diameter fails to contact post 47 and consequently moves forward an additional distance to rider lug 70 before actuating the linkage so that finger plate 53 rotates only one-fifth as far moving the indicator pointer only up to the twelve-minute calibration. If additional pennies are deposited up to five, the same operation is repeated as described above except in the instance of a second penny the wedge shaped finger pawl 69 engages second tooth 81 of finger plate 53 and the flange 84 on limiting lever 83 engages the second tooth 89 of limiting finger plate 86; the third penny causing the third tooth on each plate to be engaged, etc. All of the setting actions are achieved only after manual power has been expended and thus are free of any external forcing by the person depositing the coin.

So now the finger plate 53 and indicator pointers 56 are positioned according to actual coin value deposited. This rotation has in turn been transmitted to shaft 90 which is connected between finger plate 53 and clock mechanism 91 through a suitable slip clutch 92 which permits the finger plate 53 to be rotated clockwise in opposition to normal movement of the clock. Once the clock is set, however, the clutch friction is sufficient for the clock to drive finger plate 53 and the indicator pointers 56 attached thereto back through a counterclockwise rotation to the zero setting at a velocity required to traverse the distance back to the zero setting in the time indicated. In the event that the clock mechanism 91 is still operating when the indicator pointers have returned to zero and is there restricted to any further movement by shoulders 93 on time indicator plates 58, the clock mechanism is permitted to continue operating until it has run down by the slip clutch 92.

The clock mechanism 91 is provided with driving energy automatically as in the following manner: Attached to the left hand end of rack 38 and projecting to the rear is a lever 94. This lever is shaped substantially as shown in Figures 5 and 8 and is engaged with post 95 on arm 96 which is connected with sector gear 97. Arm 96 and gear 97 are free to rotate about pin 98. Meshed with gear 97 is another sector gear 99 which delivers winding torque to a suitable clock spring (not shown) of the meter timing mechanism as by means of shaft 100. The winding operation is accomplished as follows: As a coin is fed through the receiver 33 on the in stroke, shaft 34 is rotated by the forward motion, sector gear 35, gear 36, and pinion 37 driving rack 38 to the right as described previously. This motion also carries lever 94 to the right thereby rotating post 95, arm 96 and sector gear 97 in a counterclockwise direction about pin 98. Being meshed with sector gear 99, the latter and shaft 100 are driven clockwise through an angle sufficient to wind or store energy in the clock spring enough for driving the timing mechanism in excess of one hour. As the spring runs down driving the paid-for timing operation, sector gears 97 and 99 and their appendages rotate back to their initial positions. Although other arrangements in accordance with the invention are contemplated, it will be noted, in connection with the present embodiment, that the clock mechanism is wound the same amount whether a nickel or a penny is deposited.

To explain the details and operation of a time indicator plate 58 and its mechanism, attention is directed to Figures 9, 10 and 11. The time indicator plate is shaped as indicated in Figure 9 and is provided with a row of nine rectangular slots separated by a space equal to the width of the slots. The top edge of the time indicator plate is curved, the curve extending to shoulders 93 and 101, one on each side, whose function is to limit the sweep of the indicator pointer 56. The upper face of the time indicator plate 58 is calibrated from one to sixty minutes to show the number of minutes of parking time remaining. The time indicator plate 58 is affixed to the mechanism by being screwed to posts 102 as shown in Figures 5, 6, 7 and 12. Mounted behind the open slots 104 of time indicator plate 58 is signal plate 103 which is held in position by posts 105 (Fig. 11) which protrude through slots 106 and whose purpose it is to guide the lateral movement of the signal plate 103 and limit its travel as well as to register the position of the signal plate with respect to the open slots 104. The front face of signal plate 103 is printed with "Parking Fee Paid" and "Violation," the letters of which are spaced alternatively so that when the signal plate is shifted to the left to the limit of its movement as permitted by slots 106 the phrase "Parking Fee Paid" is displayed through rectangular slots 104 in time indicator plate 58. This position is illustrated in Figure 9. When the signal plate is moved to its extreme right hand position as shown in Figure 10 the word "Violation" appears through slots 104.

After a coin has been deposited and an indicator pointer 56 has moved to some position such as shown in Figure 11, the signal plate 103 moves to the right (note that these directions will be opposite from those described in Figures 9 and 10 as Figure 11 is a rear view) by spring tension from spring 107. In this position "Parking Fee Paid" is displayed as illustrated in Figure 9. After the time paid for elapses and the clock mechanism has returned the time indicator pointer 56 to zero position, the pointer contacts upper lever arm 108 which rotates about pin 109 as does lower lever arm 110 which is connected to the upper lever arm 108. This rotation causes the lower lever arm to move clockwise as seen in Fig. 11 and engage post 111 which is fixed onto signal plate 103. As post 111, and likewise signal plate 103 are moved to the left against tension of spring 107, the word "Violation" appears in the rectangular slots 104 in time indicator plate 58 (see Fig. 10). The signal plate remains in this position until another coin is deposited, at which time indicator pointer again moves to the left and the above described operation is repeated.

As many possible embodiments may be made of my invention and as many changes may be made in the embodiment hereinbefore set forth, it is to be understood that all matter described herein, or shown in the accompanying drawings, is to be interpreted as illustrative and not as a limitation.

I claim:

In apparatus of the class described, in combination, a face plate having a timing scale thereon and a multiplicity of openings therein, a cooperating back plate slidably mounted on the back of said face plate having thereon two sets of legends for alternate display through said openings in said face plate, spring means urging said back plate in one direction for displaying one set of legends through the openings of said face plate, lever means pivotally mounted on the back of said face plate for moving said back plate in another direction for displaying the other set of legends through the openings of said face plate, and a timing pointer movable over said timing scale of said face plate and contacting said lever means at one extreme position thereof to move said back plate against the action of said spring means to display said one set of legends and releasing said lever means and back plate to the action of said spring means, in being moved away from said extreme position, to display said other set of legends.

ROBERT BROUSSARD.

REFERENCES CITED

The following references are of record in the file of this patent:

UNITED STATES PATENTS

| Number | Name | Date |
|---|---|---|
| 516,890 | Hentz | Mar. 20, 1894 |
| 562,194 | Peck | June 16, 1896 |
| 2,025,511 | Johnson | Dec. 24, 1935 |
| 2,227,181 | Finch et al. | Dec. 31, 1940 |
| 2,269,731 | Orenstein | Jan. 13, 1942 |
| 2,288,961 | Toce et al. | July 7, 1942 |
| 2,304,012 | Neff | Dec. 1, 1942 |